Patented Mar. 10, 1942

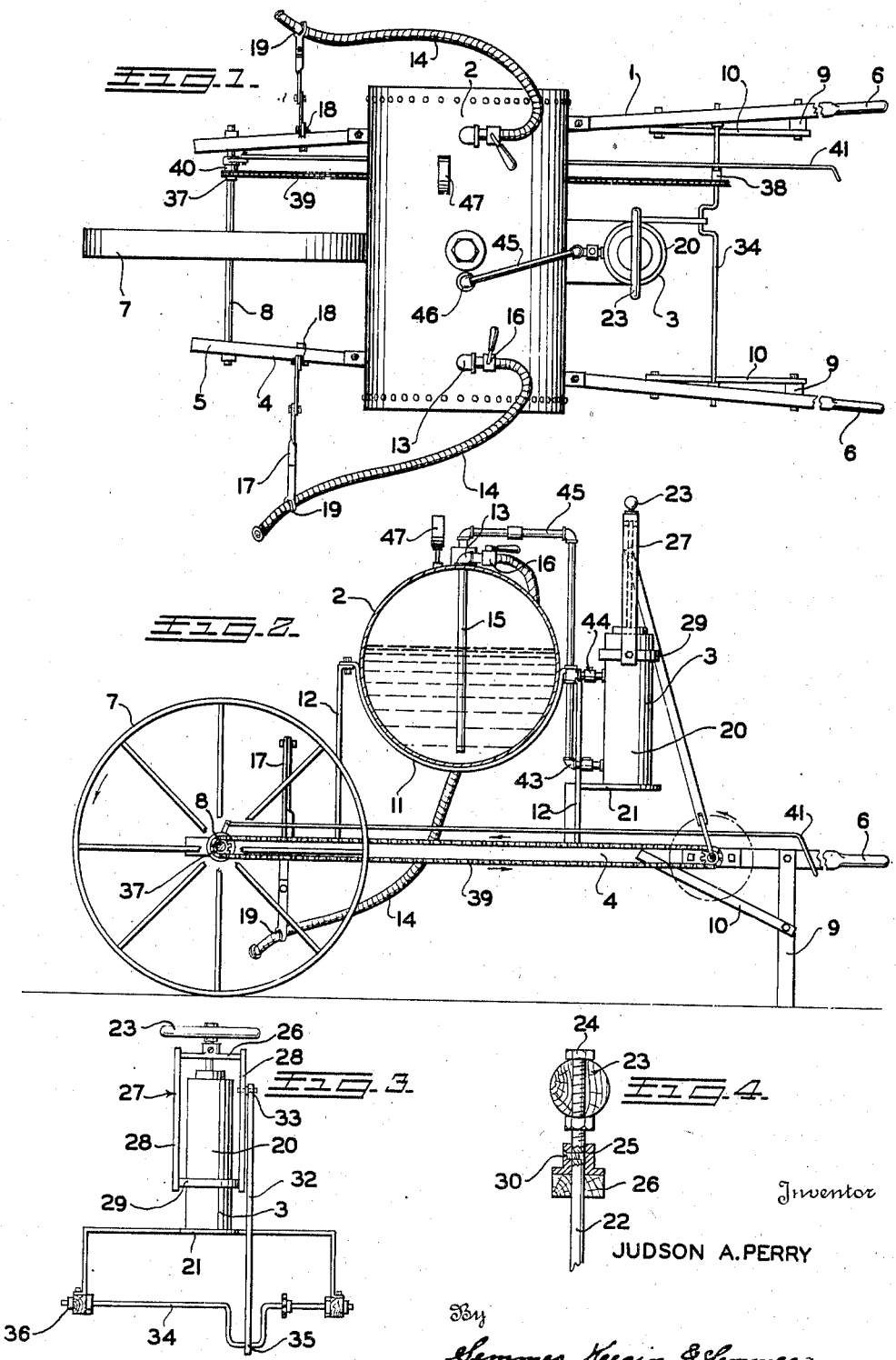

2,275,594

UNITED STATES PATENT OFFICE 2,275,594

AGRICULTURAL IMPLEMENT

Judson A. Perry, Norfolk, Va., assignor of fifty one-hundredths to George D. Whitehurst, Norfolk, Va.

Application February 3, 1939, Serial No. 254,488

3 Claims. (Cl. 299—40)

Generically, the present invention relates to agricultural devices and specifically has reference to a device for spraying liquid insecticides, or the like, upon plants, etc.

An object of my invention is to provide an insecticide spraying device with a novel piston and cylinder construction for creating air pressure within the source of insecticide.

Another object of the present invention is to provide a liquid insecticide spraying device having a piston and cylinder construction for creating air pressure wherein a frame is slidably mounted on the cylinder to permit reciprocatory movement to be imparted to the piston.

More specifically, my invention provides a portable wheel barrow-like frame having mounted thereon a drum containing a liquid insecticide. Also supported on the frame and in communication with the interior of the drum is a cylinder and piston device that is employed to create air pressure within the drum. A link is associated with the piston rod at its upper end and the lower extremity of the link is connected to a crank journaled in the frame. A chain is trained over a pair of sprockets connected to the front axle and crank, respectively. When the chassis is moved, the rotation of the wheel will impart movement to the crank by reason of the sprocket and chain driving connection. Simultaneously, the piston will be reciprocated in the cylinder as the link connected to the piston is operatively associated with the crank.

In addition, a clutch is provided on the axle whereby the sprocket may be disconnected, thus enabling the chassis to be moved without operating the piston and cylinder device.

Furthermore, additional means are provided whereby the piston can be manually operated by the operator.

In the drawing in which like numerals represent the same or similar parts:

Figure 1 is a top plan view of my invention.

Figure 2 is a longitudinal sectional view of the structure shown in Figure 1.

Figure 3 is a front elevational view, partly in section, of the cylinder and piston and its operative parts.

Figure 4 is a fragmental sectional view of a portion of the piston rod and handle showing the manner in which the piston may be manually operated.

Referring to the drawing and more especially to Figure 1, I have depicted a frame or chassis 1 having suitably supported thereon a liquid insecticide tank or drum 2 and a device for creating air pressure 3. The frame 1 comprises a pair of arms 4 which converge at their forward ends as designated by the numeral 5. The rearward ends of the handles terminate in grip portions 6.

A wheel 7 is disposed intermediate the arms 4 and is carried by an axle 8 journaled in the arms 4.

Support legs 9 are connected to the arms 4 adjacent the grip portion 6 and are strengthened by diagonal braces 10. The support legs 9 will enable the chassis to maintain a substantially horizontal position when the device is at rest as indicated clearly in Figure 2.

The insecticide drum 2 is disposed within a substantially U-shaped support member 11 that is attached to vertical supporting arms 12 associated with the frame 1. Outlets 13 are provided on the upper portion of the drum and a flexible conduit 14 is attached to each outlet. A pipe 15 extends into the interior of the drum and is attached to the outlet 13 to permit the liquid insecticide to flow from the drum into the flexible conduit 14. Moreover, control valves designated 16 are provided adjacent the outlets 13 to control the flow of insecticide through the flexible tube 14. In addition, the discharge end of the flexible conduit 14 is provided with a spray nozzle of any desired construction (not shown). Knuckle joints 17 are attached to the frame 1 and tube 14 at 18 and 19, respectively, to permit the tube to assume the desired position. Manifestly, the flexible tube, in connection with the knuckle joint, will permit the operator of the device to set the tube at the desired location for spraying the particular substance in question and no further action is necessary on his part to assure a uniform spraying.

As previously indicated, an important feature of the present invention is the provision of a device for creating air pressure within the tank 2, and to accomplish this purpose, the air pressure creating arrangement 3 is disposed adjacent the tank 2. The device 3 comprises a cylinder 20 that is carried by the frame 1 on a support 21. A piston rod 22 provided with a piston head (not shown) is adapted to reciprocate in the cylinder 20 and an operating handle 23 is removably secured to the upper end of the rod 22 by bolts or the like 24. The piston rod extends through an aperture 25 formed in a cross-arm 26 of a frame designated generally 27. The frame 27 also comprises a pair of vertical arms 28 that are suitably secured to the cross-arm 26 at their upper ends and the lower ends of the arms are secured to a collar 29 that encircles the cylinder 20. The collar 29 is, of course, of such diameter that it is free to move up and down.

In Figure 4 it can be seen that a screw or the like 30 is enthreaded in an aperture formed in the cross-arm 26 and also extends into a second aperture formed in the piston rod 22. It will be readily appreciated that when the screw 30 is rotated to a point where it projects into the aperture in the piston rod that the piston rod will move in unison with the frame 27 as will later be more fully discussed. On the other hand, when the screw 30 is removed from the aperture in the piston rod 22, the piston rod is free to reciprocate in the bore formed in the cross-arm 26 when the handle 23 is manually actuated by the operator.

In order to reciprocate the piston rod 22 automatically the following arrangement is provided. An elongated link 32 (see Figure 3) is attached at its upper end to one of the arms 28 as shown by the numeral 33. The opposite end of the link 32 is connected to a crank 34 as depicted at 35. The crank is journaled at its ends in the arms 4 as shown by the numeral 36.

In order to transmit movement to the crank 34, I provide a sprocket 37 that is mounted on the front axle 8. A second sprocket 38 is associated with the crank 34 and a driving chain 39 is trained over the sprockets 37 and 38, respectively. Obviously, when the frame 1 is moved and rotary movement thus imparted to the wheel 7, the axle 8 will be rotated thereby transmitting movement to the crank 34 through the driving connection above described. The link 32 by virtue of its connection to the crank 34 will likewise be moved and as the link is connected to the frame 28, the piston rod 22, due to its connection to the frame, will be reciprocated in the cylinder 20. It is believed readily apparent that so long as the frame is being moved, reciprocatory movement will be transmitted to the piston rod 22 thereby creating the necessary air pressure.

In the event, however, it is desired not to operate the piston rod 22 while the chassis is being moved, I mount a clutch 40 on the front axle 8 adjacent the sprocket 37. An operating lever 41 is connected to the clutch 40 and the free end of the lever terminates adjacent the grip portions 6 of the arms 4 to permit the operator to actuate easily the clutch. Clearly, the clutch 38 will enable the operator to disengage the sprocket 37 from the front axle 8 thereby preventing operation of the driving chain 39.

In order to permit the pressure created by the device 3 to be introduced into the interior of the drum 2, the cylinder 20 is provided with outlet and inlet ports 43 and 44, respectively. Pipes designated 45 are attached to the connections 43 and 44 and also communicate with the interior of the drum 2 as shown at 46. In addition, I also associate a gage 47 with the drum 2 to provide a visible means to enable the operator to determine the pressure within the drum 2.

As previously adverted to, manual control of the piston rod 22 can be accomplished by actuation of the screw 30. Referring now to Figure 4, it will be noted that by rotating the screw to remove the shank from the aperture in the piston rod 22, the rod will no longer be operatively connected with the frame 28 but is free to reciprocate in the bore formed in the cross-arm 26. Manifestly, the operator can reciprocate the piston rod 22 within the cylinder 20 by actuation of the handle 23.

From the foregoing description it is believed apparent that I have provided a liquid insecticide spraying device that is relatively simple in construction and operation which can be manufactured at a reasonable cost. Moreover, with my invention it is possible to always have the necessary air pressure within the insecticide tank thus assuring proper spraying. In addition, there is provided means for both automatically and manually maintaining the desired air pressure within the insecticide tank.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In a vehicle of the character herein set forth, a pair of arms, an axle journaled in the arms adjacent one end thereof, a handle at the opposite end of each arm, a ground engaging wheel supported by the axle intermediate the arms, legs carried by the arms adjacent to the handles for supporting the vehicle, a tank supported by the arms, a bracket mounted on the arms, a cylinder mounted on the bracket and in communication with the tank, a piston mounted for movement in the cylinder, a frame supported for sliding movement on the cylinder and operatively connected to the piston, a crank journaled in the arms rearwardly of the cylinder, a link having one end attached to the frame and the opposite end connected to the crank, a sprocket mounted on the crank, a second sprocket mounted on the axle, a chain trained around said sprockets whereby movement of the wheel will be transmitted to the crank thereby imparting movement to the piston, a clutch carried by the axle and a clutch operating lever extending to a point adjacent to one of the handles for engaging and disengaging the clutch.

2. In a vehicle of the character herein set forth, a pair of arms converging at one end, an axle journaled in the arms at the converging end, a handle at the opposite end of each arm, a ground engaging wheel supported by the axle intermediate the arms, legs carried by the arms adjacent to the handles for supporting the vehicle, a tank supported by the arms, a bracket mounted on the arms, a cylinder mounted on the bracket and in communication with the tank, a piston mounted for movement in the cylinder, a frame supported for sliding movement on the cylinder and operatively connected to the piston, a crank journaled in the arms rearwardly of the cylinder, a link having one end attached to the frame and the opposite end connected to the crank, a sprocket mounted on the crank, a second sprocket mounted on the axle, a chain trained around said sprockets whereby movement of the wheel will be transmitted to the crank thereby imparting movement to the piston, a clutch carried by the axle and a clutch operating lever extending to a point adjacent to one of the handles for engaging and disengaging the clutch.

3. In a vehicle of the character herein set forth, a pair of arms, an axle journaled in the arms adjacent one end thereof, a ground engaging wheel supported by the axle, a tank supported by the arms, a bracket mounted on the arms, a cylinder supported on the bracket and in communication with the tank, a piston mounted for movement in the cylinder, a frame supported for sliding movement on the cylinder and operatively connected to the piston, a crank journaled in the arms rearwardly of the cylinder, a link having one end attached to the frame and the opposite end connected to the crank, a sprocket mounted on the crank, a second sprocket mounted on the axle, and a chain trained around said sprockets whereby movement of the wheel will be transmitted to the crank thus imparting movement to the piston.

JUDSON A. PERRY.